(12) United States Patent
Firth

(10) Patent No.: US 10,144,144 B2
(45) Date of Patent: *Dec. 4, 2018

(54) POWER TOOL CUTTING APPARATUS

(71) Applicant: Power Box AG, Zug (CH)

(72) Inventor: Robert Firth, Pocklington (GB)

(73) Assignee: Power Box AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,929

(22) Filed: May 12, 2016

(65) Prior Publication Data

US 2016/0303756 A1    Oct. 20, 2016

Related U.S. Application Data

(63) Continuation of application No. 12/598,935, filed as application No. PCT/GB2008/003986 on Dec. 1, 2008.

(30) Foreign Application Priority Data

Dec. 4, 2007    (GB) .................................. 0723700.1

(51) Int. Cl.
  *B27B 5/18*    (2006.01)
  *B23D 47/02*    (2006.01)
    (Continued)

(52) U.S. Cl.
  CPC .............. *B27B 5/187* (2013.01); *B23D 47/02* (2013.01); *B23D 47/04* (2013.01); *B27B 5/22* (2013.01);
    (Continued)

(58) Field of Classification Search
  CPC ........ B27G 19/02; B27G 19/04; B23D 47/02; B23D 47/024; B23D 47/025;
    (Continued)

(56) References Cited

U.S. PATENT DOCUMENTS 1,550,520 A    8/1925   Drucker
1,644,326 A    10/1927  Crowe
    (Continued)

FOREIGN PATENT DOCUMENTS

CN    1225859 C    11/2005
CN    1958204 A    5/2007
    (Continued)

OTHER PUBLICATIONS

Machine translation of EP32383A1 by Lexis Nexis Total Patent on Jan. 18, 2018.
    (Continued)

*Primary Examiner* — Laura M Lee
(74) *Attorney, Agent, or Firm* — Woodard, Emhardt, Moriarty, McNett & Henry LLP (57) ABSTRACT

The invention relates to apparatus for providing for the powered cutting of a workpiece, typically in the form of a planar or sheet material. The apparatus includes a rotatable blade to cut the workpiece and the blade is mountable such as in a first mode of use to be capable of being held in a fixed position in which the workpiece is moved past the blade, and a second mode of use in which the blade is moved with respect to the workpiece to cut the same. The workpiece is mounted on a base and the blade is mounted with respect to the base via one or more slide members.

14 Claims, 8 Drawing Sheets

(51) Int. Cl.
*B27B 5/22* (2006.01)
*B27G 19/02* (2006.01)
*B23D 47/04* (2006.01)

(52) U.S. Cl.
CPC ............. *B27G 19/02* (2013.01); *Y10T 83/773* (2015.04); *Y10T 83/7705* (2015.04); *Y10T 83/7734* (2015.04); *Y10T 83/8878* (2015.04)

(58) Field of Classification Search
CPC ... Y10T 83/773; Y10T 83/8822; Y10T 83/68; Y10T 83/8763; Y10T 83/7763; Y10T 83/7697; Y10T 83/8773; Y10T 83/7507; Y10T 83/7726; Y10T 83/7693; Y10T 83/6608; Y10T 83/6536
USPC ....... 83/437.1, 435.11, 730, 477.2, 485, 442, 83/745, 574, 614
See application file for complete search history.

(56) References Cited

U.S. PATENT DOCUMENTS

| | | | |
|---|---|---|---|
| 1,703,179 A | 2/1929 | Skolnik | |
| 1,740,074 A | 12/1929 | Crowe | |
| 1,830,151 A | 11/1931 | Wilderson | |
| 1,894,010 A * | 1/1933 | Tautz | B23Q 1/4804 269/55 |
| 2,095,330 A * | 10/1937 | Hedgpeth | B27G 19/02 83/102.1 |
| 2,343,575 A | 3/1944 | Penney | |
| 2,366,017 A * | 12/1944 | Fortune | A61F 15/02 30/289 |
| 2,593,596 A | 4/1952 | Olson | |
| 2,747,625 A | 5/1956 | Small | |
| 2,835,285 A | 5/1956 | Gardner | |
| 2,753,938 A | 7/1956 | Thiess | |
| 2,926,709 A | 3/1960 | Kaley | |
| 3,605,537 A | 9/1971 | Pickler | |
| 3,634,975 A | 1/1972 | Hensley | |
| 3,727,502 A | 4/1973 | Steinman | |
| 3,880,032 A | 4/1975 | Green | |
| 3,945,286 A | 3/1976 | Smith | |
| 4,163,404 A * | 8/1979 | Lavis | B23Q 1/48 83/165 |
| 4,188,754 A * | 2/1980 | Yamamoto | B23D 45/021 269/87.1 |
| 4,320,678 A | 3/1982 | Volk | |
| 4,378,716 A | 4/1983 | Volk | |
| 4,428,159 A | 1/1984 | Slgetich et al. | |
| 4,452,117 A | 6/1984 | Brickner et al. | |
| 4,466,187 A | 8/1984 | Morimoto | |
| 4,494,431 A | 1/1985 | Niswonger | |
| 4,817,581 A | 4/1989 | Trentadue | |
| 4,869,142 A | 9/1989 | Sato et al. | |
| 4,995,288 A | 2/1991 | DellaPolla | |
| 5,231,906 A | 8/1993 | Kogej | |
| 5,353,670 A | 10/1994 | Mertzger, Jr. | |
| 5,440,815 A * | 8/1995 | Inkster | B27G 19/04 30/390 |
| 5,473,821 A | 12/1995 | DiMarco | |
| 5,482,026 A | 1/1996 | Russell | |
| 5,576,076 A | 11/1996 | Slootman et al. | |
| 5,664,612 A | 9/1997 | Klemma | |
| 5,794,351 A | 8/1998 | Campbell et al. | |
| 6,108,912 A | 8/2000 | Radigan | |
| 6,276,990 B1 | 8/2001 | Greenland | |
| 6,427,677 B1 | 8/2002 | O'Banion et al. | |
| 6,578,460 B2 | 1/2003 | Sartori | |
| 6,932,073 B2 | 8/2005 | Zhang | |
| 7,819,111 B2 | 10/2010 | Wise | |
| 7,946,906 B2 | 5/2011 | Gifford et al. | |
| 2002/0104416 A1 | 8/2002 | Brickner, Jr. et al. | |
| 2005/0016631 A1 | 1/2005 | Zhang | |
| 2005/0098010 A1 | 5/2005 | Hu | |
| 2006/0042442 A1 | 3/2006 | Ushiwata et al. | |
| 2006/0053629 A1 | 3/2006 | Martin | |
| 2006/0201299 A1 | 9/2006 | Santa Ana | |
| 2008/0047411 A1 | 2/2008 | Cao | |
| 2008/0276773 A1 | 11/2008 | Togare | |
| 2010/0050446 A1 | 3/2010 | Heflin et al. | |

FOREIGN PATENT DOCUMENTS

| | | | |
|---|---|---|---|
| CN | 200945562 Y | 9/2007 | |
| DE | 494021 | 3/1930 | |
| EP | 0 032 383 A1 | 7/1981 | |
| EP | 0 941 797 A2 | 9/1999 | |
| EP | 1 500 463 A2 | 1/2005 | |
| EP | 1 591 215 A1 | 11/2005 | |
| EP | 1591215 A1 * | 11/2005 | ............ B23D 45/024 |
| FR | 2528348 A1 * | 12/1983 | ............ B23D 45/024 |

OTHER PUBLICATIONS

English translation of First Office Action issued by Chinese Patent Office dated Jun. 30, 2011 in related CN 200880015341.9.
Examination Report received in related EP 08870645.2 issued by the EPO dated Jul. 16, 2013.
Examination Report received in related EP 08870645.2 issued by the EPO dated May 21, 2014.
Examination Report received in related EP 08870645.2 issued by the EPO dated Jan. 3, 2011.
Machine translation of CN1225859C by Lexis Nexis Total Patent on Jul. 16, 2018.
Machine translation of CN1958204A by Lexis Nexis Total Patent on Jul. 16, 2018.

* cited by examiner

POWER TOOL CUTTING APPARATUS

CROSS-REFERENCE TO RELATED APPLICATIONS

The present application is a continuation of U.S. patent application Ser. No. 12/598,935 filed Jan. 28, 2010, which is a national stage of International Application No. PCT/GB2008/003986, filed Dec. 1, 2008, which claims the foreign priority benefit of United Kingdom Patent Application No. 0723700.1, filed Dec. 4, 2007, all of which are hereby incorporated by reference.

The invention to which this application relates is to apparatus which can be used to perform cutting actions on one or more work pieces such as, but not exclusively, work pieces in the form of sheet material such as, for example, wooden and/or laminate flooring.

With any form of work piece which is required to be fitted into a particular type of area, there is often a need for the same to be cut to suit particular area dimensions and area edges and very often a need for different cuts to be used such as rip cuts and cross cuts. For example, when fitting laminate flooring in a room, at least certain of the strips of laminate will be required to be cut to a particular length or width where the same are to be located at or adjacent to walls of the room or other structures within the building. Conventionally, this can be done manually by using a saw but, often the accuracy and quality of cut which can be achieved, is unsuitable and can lead to the finished floor having a poor appearance and/or not fitting correctly. A further problem is that the manual cutting of the laminate sheet material can be tiring for the person and therefore on occasion, they may attempt to perform the cutting action using other power tools which may not be suitable for the particular purpose and can therefore be dangerous to use and therefore may not perform a particularly attractive finish.

It is also known to provide apparatus which is of a size and scale which can accept the dimension of the sheet material to cut the same but that apparatus tends to be of a form which is located in a work shop or other permanent location and therefore can not be used on site to perform the cutting operation on the sheet material. This form of apparatus is therefore of little use to a person who may be fitting the laminate flooring in a particular room or confined or restricted space as, in many cases, the dimensions of the area in which the sheet material, such as wood floor, composite wood laminates, skirting boards, door casings, floor panels, paneling, and the like, is to be fitted are not known and therefore not all of the items of sheet material can be cut to size prior to transporting the same to site for fitting and therefore cutting on site is required to be performed.

An aim of the present invention is therefore to provide apparatus of a form which can be used to perform a cutting action on a work piece such as laminate flooring, flooring panels or the like and to allow the cutting action to be performed on site and in an accurate and safe manner.

In a first aspect of the invention, there is provided a powered cutting apparatus, said apparatus comprising a base onto which a work piece to be cut can be placed, and guide means including at least one slide member, a cutting unit comprising a rotatable blade, a guard for the same, and drive means for rotating said blade when switched on, said cutting unit mounted on and to one side of the guide means such that the blade is spaced from the guide means and wherein a locking assembly is provided to allow the operation of the apparatus in a first mode in which the cutting unit is movable along the guide means when the locking assembly is released and in a second mode when the locking assembly is locked in which the cutting unit is fixed in position on the guide means and the workpiece is moved past the same.

Typically, in the first mode the workpiece is held in a stationary position with the cutting unit moved to cut through the workpiece and form a cross cut and in the second mode of operation the workpiece is moved past the stationary cutting unit such that the rotating blade therein cuts the workpiece to form a rip cut.

Typically there is provided a guard which at least partially encloses the blade in operation, said guard capable of being held in a fixed, safety position by an interlock assembly. Typically the interlock assembly is biased towards the fixed guard position, and can be released by an operator with their hand when the apparatus is in the first mode of operation, and is released by movement of the said locking assembly to allow the second mode of operation. In the second mode of operation the guard is free to move to a raised position to travel along the top surface of the workpiece when contacting the workpiece, as the interlock assembly is released.

Typically, when released in either mode the leading edge of the guard is capable of rising up the front edge of the workpiece and along the top surface of the workpiece being cut. It is safe for the guard to be held in the raised position when in the second mode of operation because the cutting unit is fixed and therefore the user's hands do not need to be located on the cutting unit when the blade is rotating and instead are located at a remote location on the workpiece to move the same and/or using a pushing tool to push the workpiece.

In one embodiment, the blade is positioned such that at least a lower portion thereof, is received within a slot in the base, said slot running parallel to at least one slide member and along which slot, the said blade moves when the cutting and handle assembly are moved along the slide.

In one embodiment the cutting unit can be held in a fixed position by the operation of the locking assembly and access gained to the blade to allow the same to be changed when worn, or a different type of blade is required to be used. In this case when the blade is released from the cutting unit the same can be removed by passing it through the slot to the underside of the base and the new blade can be introduced to the cutting unit through the slot.

In one embodiment, two slides are provided, said slides running parallel to one another and, in one embodiment, located so as to be one above the other. The slides are typically provided in a fixed location on the base and, in one embodiment, a first bearing assembly is provided to locate on the lower slide and second and third bearing assemblies are provided to locate on the upper slide. It should be appreciated that while this is a preferred embodiment, other slide numbers and configurations can be used and are incorporated herein.

Typically control means to allow the operation of the apparatus are positioned on the cutting unit so as to lie intermediate the blade and the handle assembly of the apparatus.

In one embodiment, the base is substantially planar and rigid and can be manufactured of a wood or wood based material or metal or metal alloy and supported on the support surface by feet which are provided to resist movement of the apparatus across a support surface when using the apparatus. In one embodiment, and where necessary, load spreading washers can be used to secure components to the base to spread load and avoid problems caused by base degradation or corrosion. Alternatively a stand can be provided to allow the apparatus to be raised from the support surface.

In one embodiment, the base can be used as storage means for components which are not in use, said components including any or any combination of, one or more fences against which the work piece abuts, and/or a pushing device which can be used by the user of the apparatus to contact with the work piece to be cut and push said work piece into position and/or move the work piece past the blade so as to perform the cutting operation.

If required carrying means such as a strap, handle or the like can be provided on or attached to the apparatus. Typically the apparatus is portable and can therefore be transported for use at the location at which the workpiece which is to be cut is to be fitted in place for use. This therefore means that persons such as joiners, carpenters or the like can cut the workpiece to the desired size and shape and therefore do not need to leave the site every time they require cuts to be made, and/or do not need to take accurate measurements and then go off site to do the work and/or do not need to invest in relatively expensive machinery and/or to pay other parties to perform the cutting operations.

In one embodiment, the apparatus includes a fence for use in the second mode of operation in performing a cut called a rip cut when the workpiece is moved with respect to the cutting unit, with the contact face of the fence, substantially parallel to the elongate axis of the slide members. The fence is preferably movable between positions intermediate the cutting blade and the slides so as to provide a contact face at a required location and against which an edge of the work piece can be placed to ensure accurate cutting, and therefore ensure that the cut in the workpiece is parallel with the edge of the workpiece in contact with the fence.

In one embodiment, the positioning of the fence can be selected and locked using one or more locking means such as threaded bolts or screws and/or a cam assembly. Typically the fence assembly is located with one or more slots on a baseplate which receive locking means which are secured to the base, the length of said slots defining the extent of variation in the position of the contact face and guiding the movement of the fence to ensure that the contact face of the fence against which the work piece is located is maintained in a substantially parallel relationship with the cutting plane of the blade.

In one embodiment, a fence assembly is provided for use when performing a cross cut on the workpiece in the first mode of operation, said fence assembly rotatably positionable within a predefined range so as to allow angular adjustment of an edge face of the same against which the work piece can be positioned to allow an angular cut to be created along the work piece.

In one embodiment, the said fence assembly incorporates a clamp which passes through the base and has a portion which can be tightened onto the work piece to clamp the same in position.

In one embodiment, the said fence assembly is pivotally movable within a predefined range such as ±10° and/or movable to predefined angle locations.

Typically, the handle assembly is located on and/or formed as part of the bearing assembly such that the force applied by the user to slidably move the cutting unit along the slide members, which force will also typically include a downward component, is located close to the slide members thereby ensuring that the sliding movement exerted on the cutting unit, is accurately controlled.

Typically, the drive means is in the form of an electric motor which is mounted with its longitudinal axis in a substantially horizontal plane, perpendicular to the axis of rotation of the blade.

The blade is preferably driven so as to rotate with respect to the workpiece such that the teeth pass through the workpiece from the face closest to the base to the opposing face, thus performing an upcutting action. This prevents the workpiece from being "driven" by the action of the blade in a direction past the cutting head and hence prevents possible injury to the user of the apparatus by uncontrolled movement of the workpiece when being cut.

In one embodiment, the handle assembly includes a grip portion, which, with respect to the position of user of the apparatus, is angled from a raised location at its furthest point from the user, to its lowest height closest to the user.

In one embodiment, the axis of rotation of the blade, is located at a fixed height with respect to the base. The guard is typically provided to enclose the majority of the cutting blade and typically said guard is formed as one piece and is slidingly and/or pivotally movable with respect to the cutting blade so as to allow a sufficient portion of the blade to be exposed to cut through the workpiece. It is preferred that at least a portion of the guard is formed of a transparent material so as to allow the interior of the guard, including the blade and workpiece, to be viewable.

In one embodiment, the guard has a leading edge which in use, when there is relative movement between the cutting head and workpiece to bring the same together, abuts with a leading edge of the work piece and then raises upwardly to the height of the top surface of the workpiece to allow the blade to be exposed to the workpiece and for the blade to then cut through the same upon further relative movement.

In one embodiment, the guard includes an adjustable cutting guide mounted at the leading face and said guard can include a laser or LED line generator provided as part thereof or mounted adjacent thereto.

Typically the position of the generator is adjustable so as to allow the guideline to be aligned with the line of cut, or both or either sides of the kerf of the blade.

In one embodiment a guide is provided to be movable so as to lie on and move along the top surface of the workpiece being cut, thereby allowing the user to maintain the guide on the workpiece in alignment with a guide line formed on the workpiece. In one embodiment a further guide may also be provided.

The guard and/or apparatus may include an illumination means which allows illumination of the area of the work piece at which the cutting action is being performed. In one embodiment the lateral movement of the guide is prevented or minimised so as to ensure the accuracy of the use of the guide.

The apparatus may also include a dust and debris collection means which allows dust and debris on the work piece which is created by the cutting action to be removed from the interior of the guard. In one embodiment, the direction of rotation of the blade is used to create an airflow which collects the dust and debris from the cut area and moves the same through the guard to exit at a location remote from the cut area.

In one embodiment, the guard is pivotally and/or slidingly movable with respect to the remainder of the cutting unit, about a position on the cutting head which is offset to the cutting blade. In one embodiment this movement is about a pivot axis or alternatively the movement of the guide is guided by at least one pin slidably movable along a slot or aperture. Typically, the movement of the guard upwardly is such that the base of the leading edge of the guard passes along and in contact with the top face of the work piece being cut.

Typically the guard, on at least one side of the blade includes a recess portion, offset from the leading edge of the same, which allows the guard to move back towards the base once the trailing edge of the workpiece passes the recess or step. This recess or step allows the rear or trailing edge of the workpiece to be held against the step and hence prevents the ongoing rotational movement of the blade from causing a "kick back" effect on the piece of material which has been cut from the workpiece. The term kick back describes the possibility of the off cut piece being driven back towards the operator of the apparatus at speed by the blade rotation and hence prevents the risk of injury.

The guard is typically biased towards a position downwardly towards the base thereby minimising the opportunity for a user to gain access to the blade as it rotates.

In one embodiment, a biasing force is exerted on the guard. In one embodiment the force is in the region of 10 Nm. This prevents or minimises the risk of the user unwittingly inserting their finger under the guard and into the path of the blade.

In one embodiment, the work piece which is cut is in the form of planar or sheet material of a maximum depth of 18 mm.

In one embodiment, the sheet material is laminate flooring or wooden composite boards or wooden boards for flooring.

Typically, the at least one slide is mounted with respect to the base, via mounting brackets, one provided at each end of the slides, or alternatively a bracket is provided at one end only so as to mount the slide, thereby leaving a slot along the remaining length of the slide between the base and the underside of the slide. This allows sheet material which is being cross cut, to be passed through the slot if required so as to allow the line to be cut on the workpiece to be positioned accurately with the blade of the cutting unit. This arrangement of the slides and brackets therefore ensures that there are a minimum number of obstructions on the base, thereby maximising the length and possible positioning of the sheet material which can be cut using the apparatus in accordance with the invention. In one embodiment a workpiece of a dimension of up to 430 mm can be placed through the slot.

Although mainly envisaged to be operated on a support surface in a horizontal plane, in one embodiment, the apparatus can be adapted to be supported with the top face of the base in another plane, such as a vertical plane, with the apparatus attached to a supported wall or other structure.

In a yet further aspect of the invention there is provided a powered cutting apparatus, said apparatus comprising a base onto which a work piece to be cut can be placed, and guide means including at least one slide member and at least one bearing assembly located on said guide means for selective movement there along, a cutting unit comprising a rotatable blade and drive means for rotating said blade when switched on, said cutting unit mounted on and to one side of the bearing assembly and wherein the cutting unit includes a guard for the blade which is pivotally movable between a first position and a second position in which the blade is sufficiently exposed to perform a cutting action, and said movement of the guard to the second position is achieved by contact with and relative movement between the workpiece and the leading edge of the guard.

Typically the guard is biased towards the first position and the contact and movement of the workpiece acts against the biasing means. Typically the guard is held in the second position while the workpiece is positioned between the underside of the guard and the base and, thereafter, the guard returns to the first position.

In a further aspect of the invention, there is provided a powered cutting apparatus, said apparatus comprising a base onto which a work piece to be cut can be placed, and guide means including at least one slide member and at least one bearing assembly located on said slide member for selective movement there along, a cutting unit comprising a rotatable blade and drive means for rotating said blade when switched on, said cutting unit supported on the bearing and said apparatus further including a handle portion mounted adjacent said at least one bearing assembly and/or intermediate said at least one bearing assembly and cutting unit.

In one embodiment the cutting unit and handle are disposed to the same side of said at least one slide member.

In a yet further aspect of the invention there is provided a powered cutting apparatus, said apparatus comprising a base onto which a work piece to be cut can be placed, and guide means including at least one slide member and at least one bearing assembly located on said guide means for selective movement there along, a cutting unit comprising a rotatable blade, a guard for the same, and drive means for rotating said blade when switched on, said cutting unit mounted to one side of the guide means such that the blade is spaced from the guide means and wherein a locking assembly is provided to allow the operation of the apparatus in a first mode in which the cutting unit is movable along the guide means with the locking assembly released and operation of the locking assembly allows operation of the apparatus in a second mode in which the cutting unit is fixed on the guide means and the workpiece is moved past the same.

In a yet further aspect of the invention, there is provided a powered cutting apparatus, for cutting a substantially planer workpiece via a cutting unit having a blade driven to be rotated, wherein said apparatus is selectively operable in a first mode in which the cutting unit is movable with respect to the workpiece to cross cut the same and in a second mode in which the cutting unit position is fixed and the workpiece is moved past the same for a rip cut to be performed.

Specific embodiments of the invention are now described with reference to the accompanying drawings wherein.

Referring to the drawings, there is illustrated apparatus 2 in accordance with one embodiment of the invention. The apparatus comprises a base 3 which can, in one embodiment, be formed of wood or ply wood material and which is provided with supporting feet 4 at the corners thereof. The feet are typically formed of a compliant anti-slip material so as to prevent the base from sliding along a support surface when in use. It should be appreciated that although the base is shown to be of a rectangular plan, the shape can be altered to suit specific requirements. The base can also receive stops or other location means which can be positioned to define a particular location for repeated cutting at the same cut line position of successive workpieces.

Figure 7:
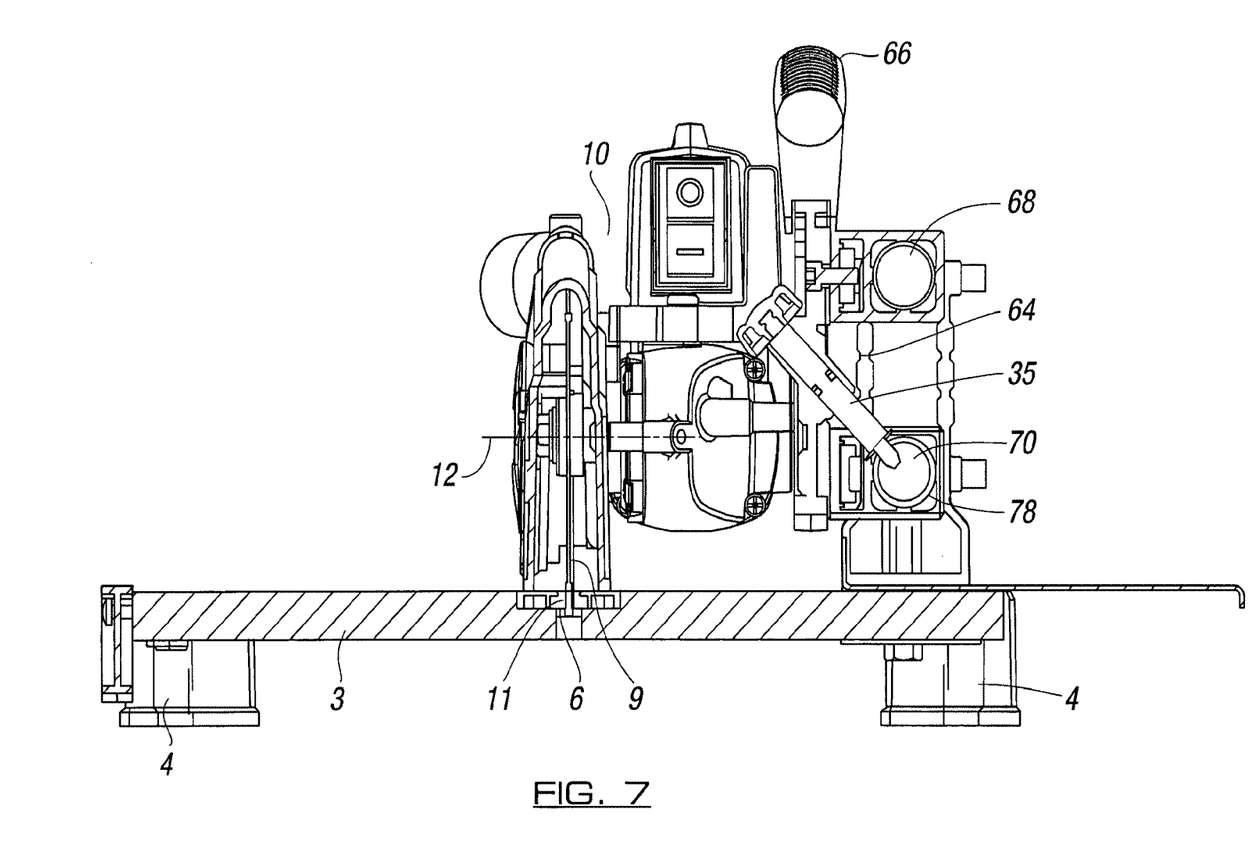
FIG. 7 illustrates a cross sectional view along line AA of FIG. 3.

A slot 6 is formed along a substantially central longitudinal axis of the base and the slot 6 is provided to receive a portion of a cutting blade 9 as shown in FIG. 7, which is provided as part of a cutting unit 10. The blade is provided to rotate about the axis of rotation 12 which is permanently spaced from the base so as to allow the lowest portion 11 of the blade to enter into or be positioned adjacent to the slot 6 in the base 3 and which, when rotated, performs a cutting operation on a work piece 103 shown in FIG. 4.

The work piece to be cut is typically relatively thin sheet material and is positioned on the base 3 at a selected location. The location can be selected with regard to a fence assembly 34 when in a first mode of operation when the cutting unit is movable, or a fence assembly 16 when in a second mode of operation with the cutting unit held in a fixed position.

The fence assembly 16 incorporates a contact face 14 against which an edge of the sheet material is positioned to position the same correctly for the rip cut cutting operation to be performed. Depending from the face is provided a support plate 18 which, in this embodiment, includes a slotted aperture 20 which receives a threaded pin or bolt 24, which is received, in turn, in a threaded aperture in the base. Further guides can be provided to ensure that the fence contact face 14 is maintained substantially parallel with the blade 6 and hence the cutting line on the workpiece.

If required, although not shown, an alternative fence assembly may be fixed in position, using the same mounting plate arrangement in which the face against which the edge of the work piece is positioned, lies perpendicular to the blade in the base.

The fence assembly 34 is also provided on the base 3 and this fence assembly can be selectively used for a cross cut in the first mode of operation to allow a cross cut to be achieved, typically across the width of the workpiece and in this case, the fence assembly 34 includes a face 36 against which an edge of the sheet material is to be positioned and this face is pivotally movable about pivot location 32, typically within substantially plus 10 and substantially minus 10 degrees of a centre datum line. Once the angular adjustment is achieved, the threaded screw or bolt 40 which sits in the slot 42 can be tightened. It will be noted that there is a further slot 38 in which a rod 37, connected to the base sits. The extent of length of the slot 38, determines the angular degree of adjustment which is possible. In one use, the cut can be directly across at 90 degrees or a range of predetermined angular positions such as macro angles 15°, 20°, 30°, 45° to be achieved are defined and location means are provided to allow the fence to be selectively retained in a particular angular location.

A clamp device 50 is provided which includes a threaded rod 52 with a foot 54, which foot can be formed so as to prevent damage to the work piece against which the same is clamped. This clamp is therefore used to maintain the work piece in a position on the base.

In order to perform the cutting operations, the cutting unit 10 is provided in connection with drive means 56 which are mounted, in this example with its longitudinal axis in a substantially horizontal plane and can be connected to a suitable power supply 58. Also provided, typically inline with the drive means, are switches 60 which allow the selective operation and rotation of the blade to perform the cutting operation.

It should be appreciated that the drive means used, and the connection means between the drive means and the blade may be altered depending on the scale of the apparatus. For example, different versions of the apparatus may be provided of different sizes such that for example, a larger version may require a drive connection between the drive means and the blade to be achieved using a drive belt, whereas other versions may require drive connections using a suitable gear assembly.

The cutting unit including the drive means, are mounted with respect to a bearing assembly 64 which is also provided with a handle assembly 66. As shown, the cutting unit and handle are offset to one side of first and second guide means in the form of slide members 68, 70. The bearing assembly is connected to the slides, in this case with a first bearing 78 mounted on the lower slide 70 and second and third bearings 72, 74 mounted on the upper slide 68 at spaced locations thereon. In one embodiment, the bearings are self-lubricating and may be detailed with inherent resilience to take into account and mitigate any tolerance which there may be in the surfaces of the slide members. Other forms of slide arrangements could be used such as linear bearings, profiled tubes for the slides and/or plain bearings.

The slide members are held in the spaced position by first and second mounting brackets 76, 80 which are secured to the base 3 and which, preferably, are secured to the base at each end of the slides thereby leaving a slot 82 between the base 3 and the underside of the lower slide 70. This slot can be used to allow the accommodation of a work piece which is being cross cut and which may be required to be slid through the slot so as to be able to position the same appropriately with regard to the blade. The handle assembly 66 typically includes a gripping portion 84 which is sloped so as to have its highest portion 86 furthest from the location 88 of the person when using the apparatus and a lower portion 90 closest to the user.

The apparatus can typically be used in two modes of operation, a first mode in which the cutting unit can be moved along the slides and a second mode in which the cutting unit 10, is held stationery with respect to the slide members 68, 70. In this second mode the work piece is moved towards the cutting blade 9 in the direction of arrow 91 and continued to be moved past the cutting blade until the cut in the work piece has been completed. In this case a side edge of the workpiece abuts with and moves along the contact surface 14 of the fence assembly 16.

Figure 6:
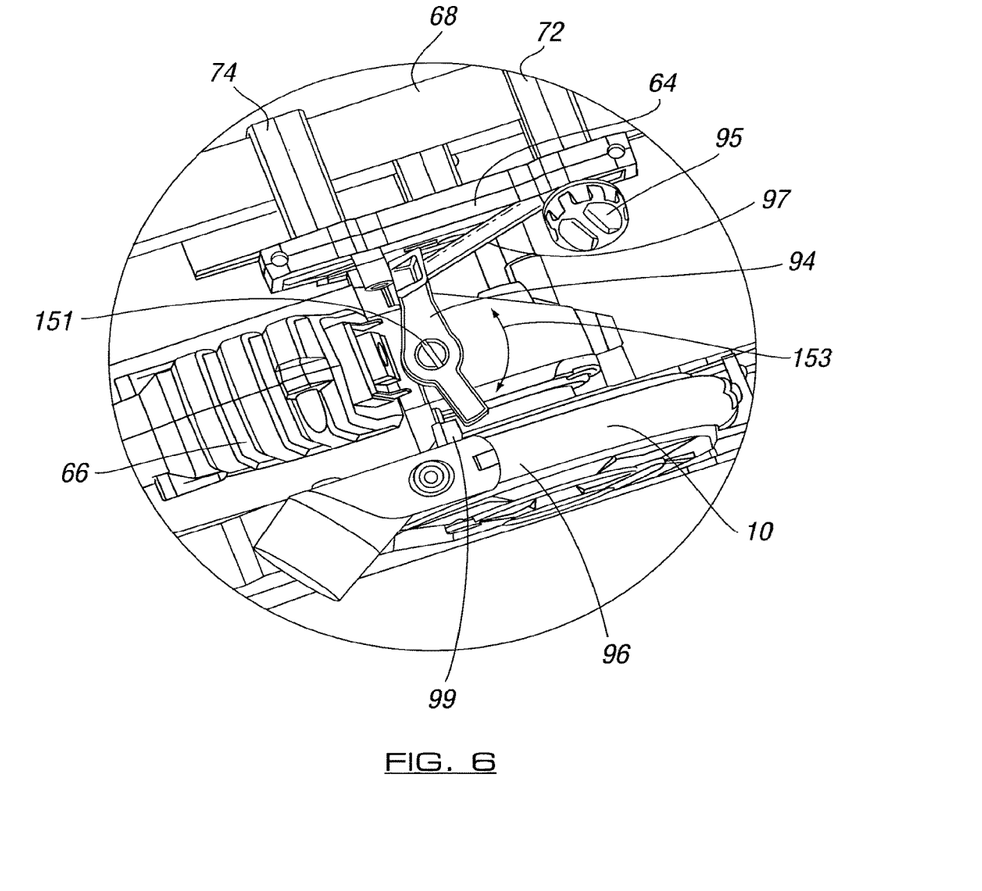
FIG. 6 illustrates detailed view of the locking assembly forth e cutting unit.

An interlock assembly 94 is provided and shown in FIG. 6. The interlock assembly is biased to hold the guard 96 in a fixed lowered position. The interlock assembly can be released by an operator with their hand when gripping the cutting head handle 66 when the apparatus is in the first mode of operation, and is released and held in that position by movement of the said locking assembly 95 when in the second mode of operation. The interlock assembly is shown in the released position in FIG. 6 and it also shows how the same pivots about axis 151 as indicated by arrow 153. When released in either mode the leading edge of the guard is capable of rising up the front edge of the workpiece and along the top surface of the workpiece being cut so as to expose sufficient of the blade to cut through the workpiece.

In the second mode of operation the guard 96 is held in an open position by the movement of the locking assembly pin 95 into the slide 68, typically into an aperture on the slide to hold the cutting unit in the fixed position. At the same time the movement of the pin engages a latch 97 of the interlock assembly 94 such that the interlock assembly pivots about axis 151 and the engagement between the interlock assembly 94 and the guard protrusion 99 is released such that the guard is free to move up and along the workpiece. The bearing assembly 64 is locked with the slide via pin 95 either by the same acting as a brake or passing into an aperture located on at least one of the slides which serves to lock the cutting unit in position for this operation mode.

Typically the interlock assembly 94 is biased towards a guard fixed position so as to ensure that the guard will stay in a lowered safety position.

In the first mode of operation a cross cut can be performed and in this case an edge of the workpiece is placed against the contact face 36 of the fence assembly 34. In this mode the work piece is held stationery and, with the locking assembly pin 95 released from the slide, the cutting unit including the bearing assembly and handle assembly are slidably movable along the slide members as indicated by arrow 92 so as to move the rotating blade along and through the work piece to perform the cross cutting operation. However the guard is in the default down position unless the operator operates the interlock latch 97 to release the interlock 94 from the guard protrusion 99. The requirement to operate the latch to free the guard for movement can be achieved by the users hand when gripping the handle 66 and means that it can be ensured that the user's hands are only at the cutting unit handle and hence well removed from the blade and therefore provide an important safety feature. When the cutting unit is in the fixed locked position the unit is in a safe position to allow the blade change to be performed.

Figure 1:
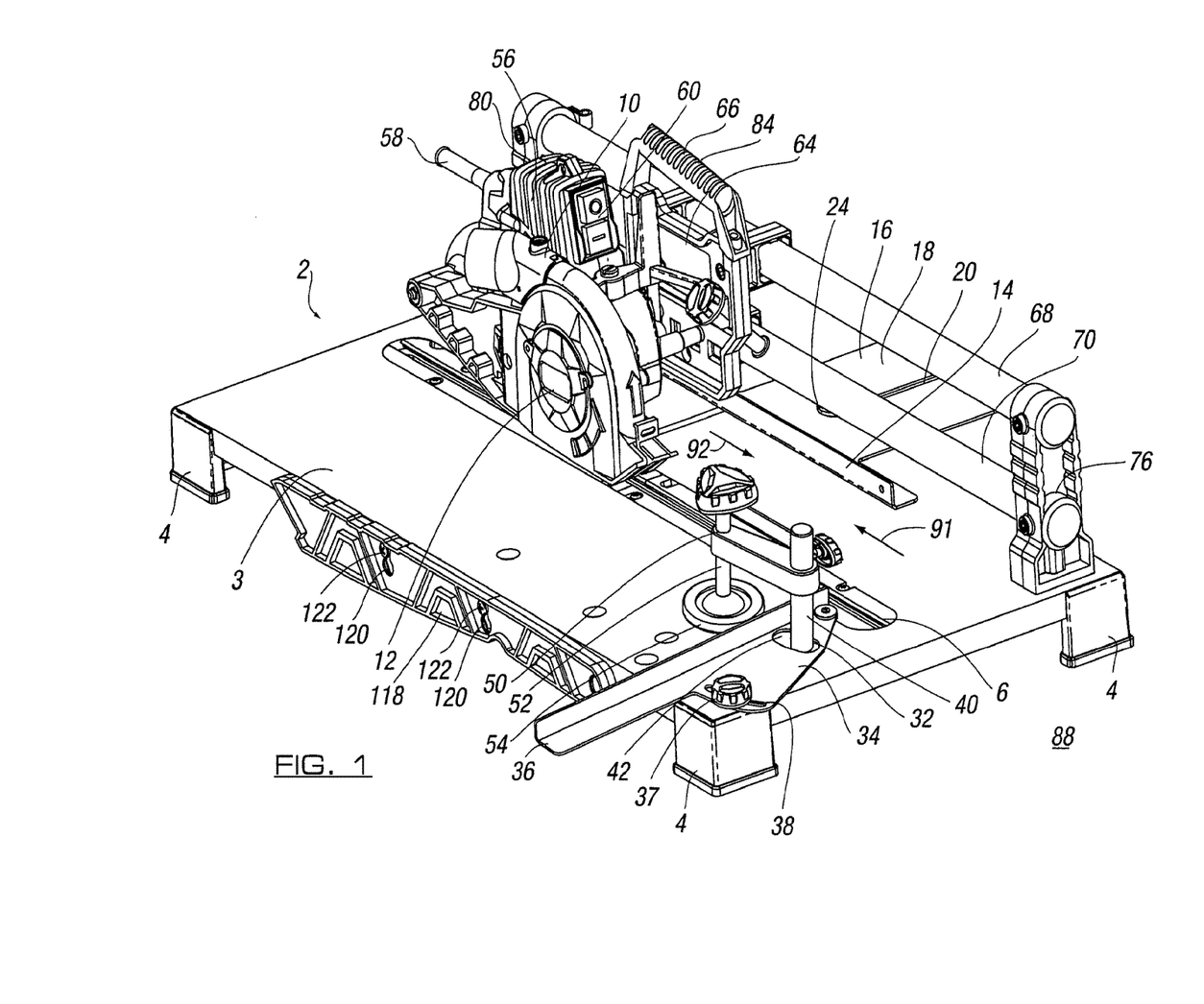
FIG. 1 illustrates a perspective view of apparatus in accordance with one embodiment of the invention.

The blade of the cutting unit is almost entirely enclosed within the guard 96, which guard is typically transparent as shown in FIG. 1 where the blade 9 is visible. The guard can be pivotally movable and/or slidably movable about axis 98.

Figure 2:
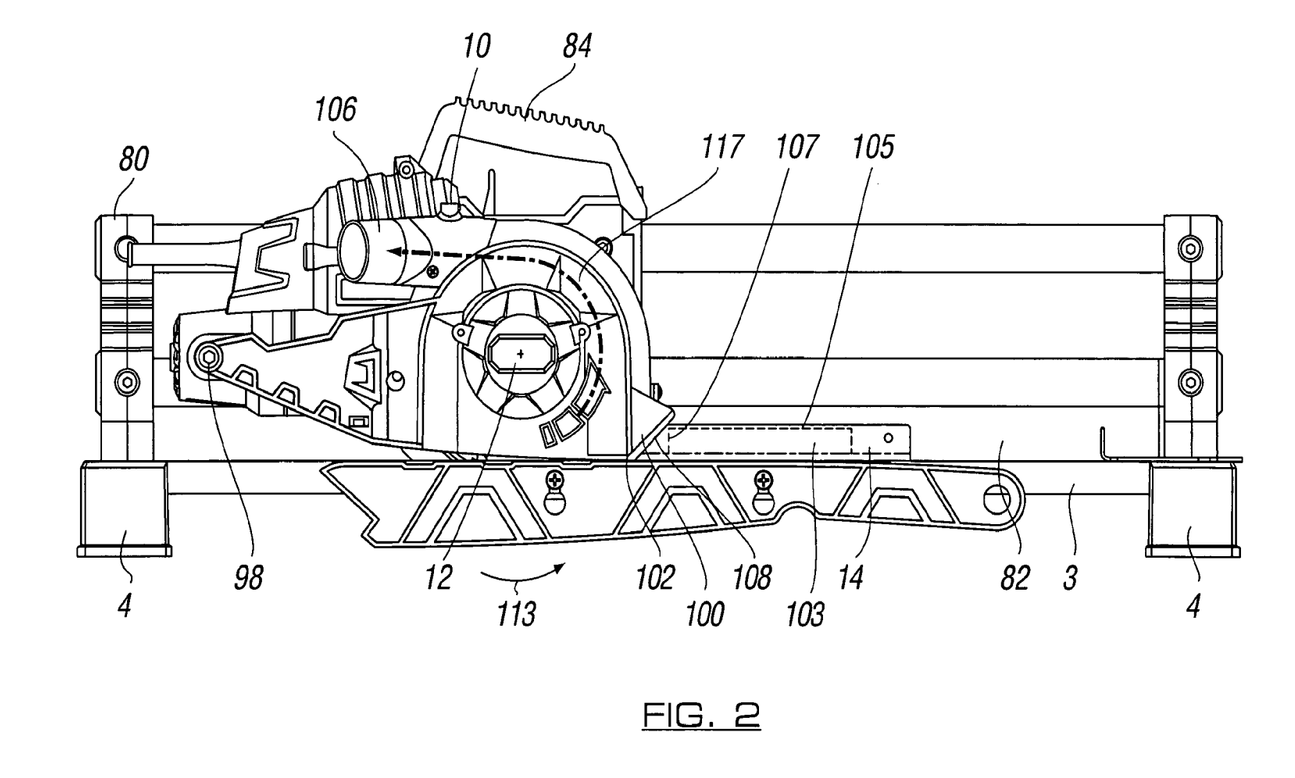
FIG. 2 illustrates a side view of apparatus of FIG. 1.
Figure 3:
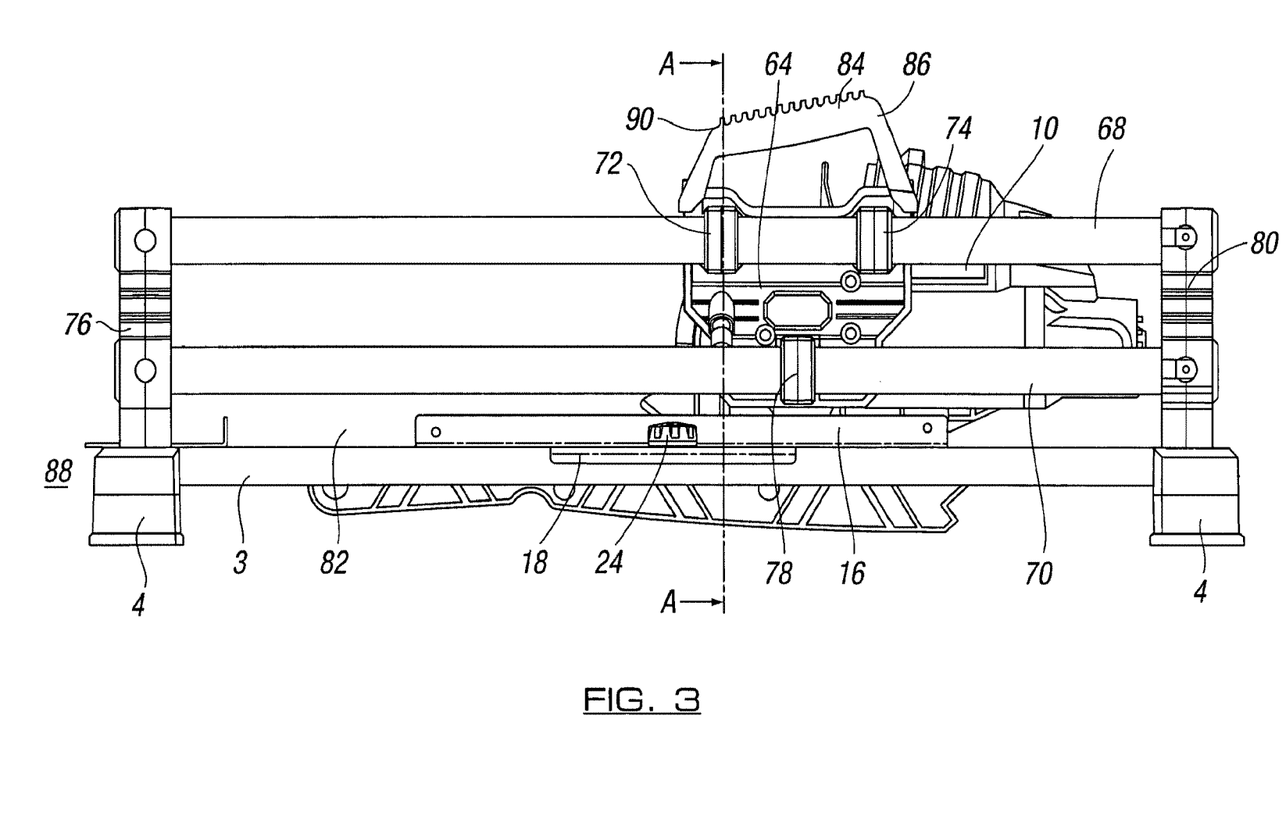
FIG. 3 illustrates an opposing side view of the apparatus of FIG. 1.

The guard is formed as a one piece unit and can be moved between a first position shown in FIG. 2 in which the lower edge 102 is in contact with or adjacent to the base 3 thereby enclosing the blade, and a second position in which the lower edge 102 is raised to lie on the top surface of the workpiece positioned on the base so that the blade is sufficiently exposed to cut the workpiece and the workpiece can pass between the lower edge of the guard and the top surface of the base. To achieve this movement the guard is provided with a leading face or edge 100 which is angled 108 such that when the front edge of the work piece 103 which is to be cut, contacts with the leading face 107 of the workpiece 103 as shown in broken lines in FIG. 2, in either mode of operation, then continued relative movement causes the angled leading edge or face 100 of the guard to ride up and over the leading face 107 of the workpiece, and so the guard is encouraged to move upwardly about the pivot axle 98 to a sufficient extent such that the lower edge 102 of the guard moves to the second position to contact and slide along the top face 105 of the work piece 103. This means that there is sufficient clearance between the guard and the base for the work piece to come into contact with the blade and be cut by the same as the blade rotates. The clearance is kept to the thickness of the workpiece thereby minimising access to the blade whilst moving. The blade is rotated in a direction indicated by arrow 113 in FIG. 2 so as to provide an upcutting action with the teeth of the blade positioned and formed so as to perform a cutting action from the base towards the surface 105 of the workpiece.

Figure 8A:
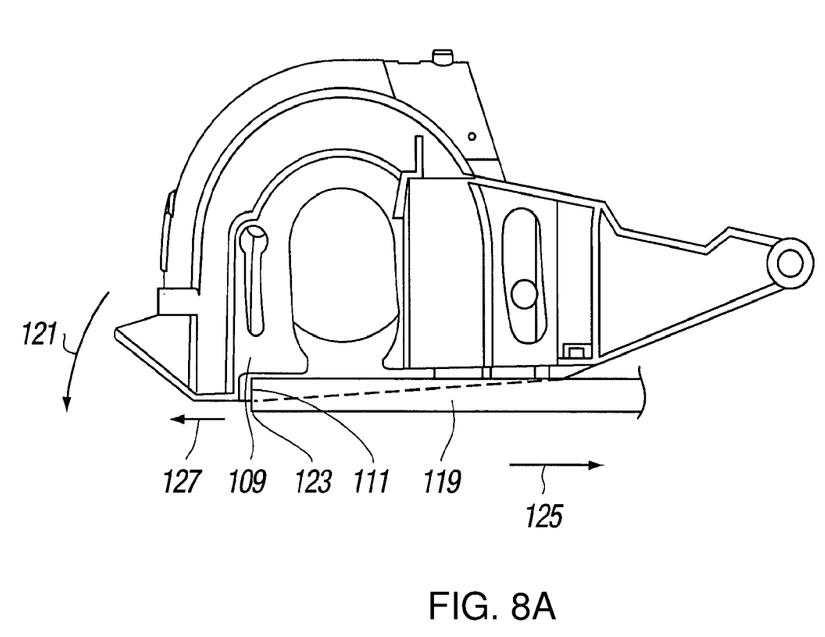
FIGS. 8A and 8B illustrate an elevation and end elevation of a blade guard in accordance with the invention.
Figure 8B:
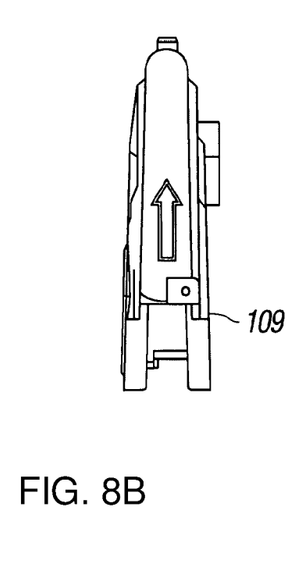

As shown in FIGS. 8A and 8B, which show the guard, the side (109) of the guard which is adjacent the "cut off" portion of the workpiece 103 is recessed at point 111 to allow the guard to drop down as indicated by arrow 121 when the trailing edge 123 of the cut off piece 119 of the workpiece 103 has passed the same in the direction of arrow 125. At this stage the cut off piece is separated from the workpiece and can be removed. The provision of the recess or step contacts with the trailing edge when the guard drops down, as shown, and hence prevents the cut off piece from kicking back and moving in direction 127 under the influence of the rotation of the blade within the guard with which the cut off piece may still be in contact. It also prevents the cut off piece becoming stuck and maintaining the guard in a potentially unsafe raised position, once the workpiece cut has in fact been performed.

Also provided at the front face of the guard, can be a guide means such as a laser generator 104 with the leading face being formed so as to ensure that there is a free path for the guideline which is generated. Alternatively, or in addition other illumination means may be provided to illuminate the portion of the work piece adjacent to the blade at any given time. It should be appreciated that the guard as herein described may be used to advantage on other designs and uses of cutting apparatus and is not confined to use with the apparatus herein described.

Figures 4A, 4B:
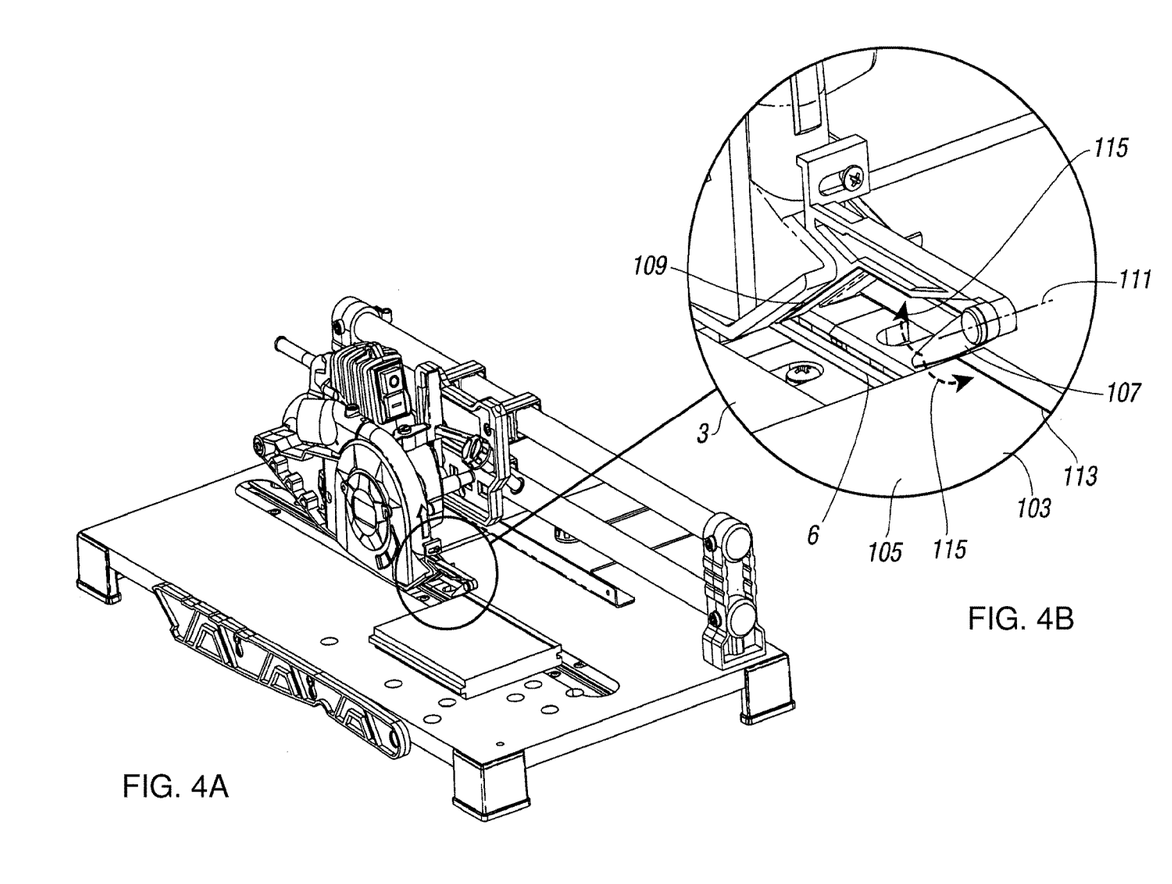
FIGS. 4A and 4B illustrate a detailed perspective view of the leading edge of the guard with sight guides attached.
Figure 5:
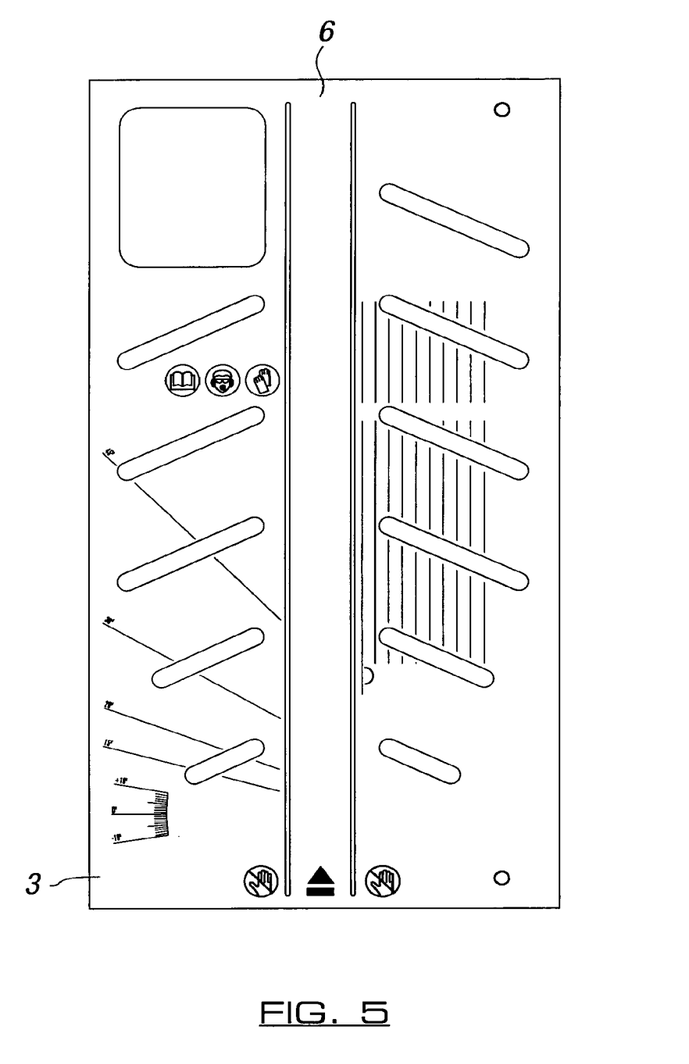
FIG. 5 illustrates a plan view of the base.

In addition or alternatively one or more sight guides 107,109 can be provided on the guard as shown in FIG. 4. The first guide 107 is mounted to move in a pendulum manner as indicated by arrows 115 about location 111 which allows the same to be moved by the contact with the leading edge of the workpiece 103 and then contact with the top surface 105 of the same. The same can be aligned with a guideline 113 applied to or generated on the top surface 105 of the workpiece 103. The second guide can be an edge of the guard which can be aligned with the blade edge and so the two guides can be used to aid accurate cutting using the apparatus.

The guard can also be provided with, or have attached, a dust collection channel 106 through which dust or debris created during the cutting operation of the blade, can be removed from the vicinity and hence allow the dust and debris to be collected, perhaps by a bag connected to the channel or by other vacuum apparatus. Typically the dust and debris is collected from the cut area by the airflow created by rotation of the blade, and carried upwardly and around the guard as indicated by arrow 117 by the airflow to an exit aperture, typically located at a tangent to the airflow above the blade.

The base 3 of the apparatus can also be used to allow other components to be stored therewith and in this case, a push member 118 is shown in a storage position via slotted apertures 120 which are received on first and second fixing means 122 attached to the base. The push member is provided for use when the apparatus is in the operating mode in which the cutting unit is stationery and the work piece is required to be pushed towards the blade. In one embodiment the base may be provided with side and length extensions to support the workpiece beyond the periphery of the base.

There is therefore provided apparatus which allows work pieces to be cut effectively and efficiently and also to allow the same to be cut on site using the apparatus as herein described.

There is therefore provided a compact and efficient cutting apparatus which is operable in two modes thereby allowing the workpiece to be inserted width wise across the cutting plane so as to be bisected without being obstructed by the product structure and also allow angular cuts to be achieved.

I claim:

1. A powered cutting apparatus for cutting a flooring work piece, said apparatus comprising:
   a base onto which the flooring work piece to be cut is placed;
   a guide means including two spaced parallel slide members located one above another and mounted on first and second mounting brackets provided at each end of the two spaced parallel slide members and first and second mounting brackets secured to said base;

a handle assembly; and a cutting unit comprising a rotatable blade having teeth for cutting wood, a guard for said cutting unit, a drive means for rotating said rotatable blade, and a bearing assembly which slidably mounts the handle assembly and the cutting unit on the two spaced parallel slide members, and to one side of said two spaced parallel slide members such that the handle assembly and rotatable blade are spaced to one side of the two spaced parallel slide members, wherein said rotatable blade defines a cutting side that is on the same side as said handle assembly and wherein said cutting unit rotates said rotatable blade such that said teeth travel upward away from said base on the cutting side;

wherein a locking assembly is provided to allow the operation of the apparatus in a first and second mode, in the first mode the cutting unit is slidably movable along the two spaced parallel slide members between said first and second mounting brackets when the locking assembly is released, and in the second mode the locking assembly is locked and the cutting unit is fixed in position on the two spaced parallel slide members, in the second mode the work piece is moved past the fixed cutting unit;

wherein in the said second mode, a pin of the locking assembly passes into an aperture located on one of the at least two spaced parallel slide member to lock the bearing assembly, handle assembly and the cutting unit in a fixed predetermined position along the two spaced parallel slide members;

wherein a slot is provided in the base, said slot running parallel to the two spaced parallel slide members and the rotatable blade is positioned with a lower portion thereof received within the slot and the rotatable blade moves along the slot when the cutting unit is moved along the two spaced parallel slide members in the first mode;

wherein the guard for the cutting unit is movable about a pivot axis between a lowered position and a raised position, said guard pivot axis offset from the portion of the guard in which the said blade is located, and the guard has a leading edge arranged to abut a leading face of the work piece and raise upwardly from the lowered position in contact with the base to move along the top surface of the work piece so as to allow the blade to be exposed to cut the work piece as the cutting unit is moved with respect to the work piece in the first mode and the work piece is moved with respect to the fixed cutting unit in the second mode, and the guard is biased towards the lowered position so as to return to the lowered position and be in contact with the base when the work piece is no longer positioned between the underside of the guard and the base so that the blade is substantially enclosed by the combination of the guard and the slot in the base; and wherein said bearing assembly is attached to both of said at least two parallel slide members which are non-rotatably fixed to the base in order to move said blade along said slot in the first mode and to retain the axis of rotation of the blade at a fixed height with respect to the base as the workpiece is cut in the first and second modes.

2. Apparatus according to claim 1, further comprising a fence assembly which is pivotally movable within a predetermined range and/or to predetermined locations and the contact face is used to contact an edge of the workpiece when performing a cross cut in the second mode of operation.

3. The apparatus according to claim 1, further comprising a control means and wherein said control means to allow the operation of the apparatus are positioned on the cutting unit so as to lie intermediate the blade and the handle assembly of the apparatus.

4. The apparatus according to claim 1, wherein the cutting unit is provided to be slidably movable along the at least one slide member in said first mode to cut through a stationary work piece to form a cross cut and in the second mode is located in a fixed position with respect to at least one of the at least two spaced parallel slide members and the work piece is moved past the blade to perform the cutting action to form a rip cut.

5. The apparatus according to claim 1, further comprising a fence which is slidably movable, the first fence having a contact face substantially parallel to the elongate axis of the at least two spaced parallel slide members and movable between positions intermediate the rotatable blade and the at least two spaced parallel slides so as to provide a contact face against which an edge of the work piece can be placed.

6. The apparatus according to claim 1, further comprising a fence assembly is pivotally movable within a predetermined range and/or to predetermined locations and a contact face of the fence assembly is used to contact an edge of the work piece when performing a cross cut in the second mode of operation.

7. The apparatus according to claim 1, wherein the handle assembly is located on and/or formed as part of the bearing assembly.

8. The apparatus according to claim 1, wherein the drive means is in the form of an electric motor which is mounted with its longitudinal axis in a substantially horizontal plane, perpendicular to the axis of rotation of the blade.

9. The apparatus according to claim 1, further comprising dust and debris removal means which utilizes the airflow created by the rotation of the rotatable blade to draw dust and debris from the cut area, through the guard such that the dust and debris exit from the cut area at a location remote from the cut area.

10. A method of changing the rotatable blade of the apparatus of claim 1, wherein the base defines an opening aligned with the slot, wherein the opening extends completely through the base, the method comprising:

moving the bearing assembly so that the cutting unit is aligned with the opening in the base;

detaching a first rotatable blade from the cutting unit;

passing the first rotatable blade through the opening in the base;

inserting a second rotatable blade through the opening in the base; and attaching the second rotatable blade to the cutting unit.

11. A powered cutting apparatus, said apparatus comprising:

a base onto which a work piece to be cut can be placed;

a first mounting bracket and a second mounting bracket secured to said base;

a guide means including at least two spaced parallel slide members;

a cutting unit comprising a rotatable blade;

a guard for said cutting unit;

an interlock assembly for the guard, the interlock assembly having a latch;

a drive means for rotating said rotatable blade;

a bearing assembly which mounts the cutting unit on the at least two spaced parallel slide members, said cutting unit mounted on and to one side of the at least two spaced parallel slide members such that the rotatable blade is spaced from the at least two spaced parallel slide members; and wherein a locking assembly is provided to allow the operation of the apparatus in a first mode in which the cutting unit is movable along the at least two spaced parallel slide members when the locking assembly is released and in a second mode when the locking assembly is locked in which the cutting unit is fixed in position on the at least two spaced parallel slide members and the work piece is moved past the cutting unit;

wherein the at least two spaced parallel slide members are mounted on the first and second mounting brackets which are secured to the base at each end of the at least two spaced parallel slide members and the cutting unit is movable between said first and second mounting brackets when in the said first mode and a pin of the locking assembly passes into an aperture located on one of the at least two spaced parallel slide members to lock the bearing assembly and the cutting unit in a fixed predetermined position along the at least two spaced parallel slide members when in the second mode; and wherein in the second mode of operation the movement of the pin into the aperture also engages the latch of the interlock assembly and the guard is free to move up and along the work piece as the work piece is moved past the fixed cutting unit to cut the work piece.

12. The apparatus according to claim 11, further comprising a first fence which is slidably movable, the first fence having a contact face substantially parallel to an elongate axis of the at least two spaced parallel slide members and movable between positions intermediate the rotatable blade and the at least two spaced parallel slide members so as to provide a contact face against which an edge of the work piece can be placed.

13. The apparatus according to claim 12, further comprising a fence assembly which is rotatably positionable so as to allow angular adjustment of an edge face of the fence assembly against which the work piece can be positioned to allow an angular cut to be created along the work piece.

14. A powered cutting apparatus, said apparatus comprising:
a base onto which a work piece to be cut can be placed;
a first mounting bracket and a second mounting bracket secured to said base;
a guide means including at least two spaced parallel slide members;
a cutting unit comprising a rotatable blade;
a guard for said cutting unit;
a drive means for rotating said rotatable blade; and
a bearing assembly which mounts the cutting unit on the at least two spaced parallel slide members, said cutting unit mounted on and to one side of the at least two spaced parallel slide members such that the rotatable blade is spaced from the at least two spaced parallel slide members; and
wherein a locking assembly is provided to allow the operation of the apparatus in a first mode in which the cutting unit is movable along the at least two spaced parallel slide members when the locking assembly is released and in a second mode when the locking assembly is locked in which the cutting unit is fixed in position on the at least two spaced parallel slide members and the workpiece is moved past the cutting unit;
wherein the at least two spaced parallel slide members are mounted on the first and second mounting brackets which are secured to the base at each end of the at least two spaced parallel slide members and the cutting unit is movable between said first and second mounting brackets when in the said first mode, and a pin of the locking assembly passes into an aperture located on one of the said at least two spaced parallel slide members to lock the bearing assembly and the cutting unit in a fixed predetermined position along the at least two spaced parallel slide members when in the second mode;
wherein a slot is provided in the base, said slot running parallel to at least one of the at least two spaced parallel slide members and the rotatable blade is positioned with at least a lower portion thereof received within the slot and the rotatable blade moves along the slot when the cutting unit is moved along the at least two spaced parallel slide members, the guard is movable about a pivot axis between a lowered position and a raised position and the guard has a leading edge arranged to abut a leading face of the work piece and raise upwardly from the lowered position in contact with the base to move along the top surface of the workpiece so as to allow the blade to be exposed to cut the workpiece as the cutting unit is moved with respect to the workpiece in the first mode and the workpiece is moved with respect to the cutting unit in the second mode and the guard is biased towards the lowered position so as to return to the lowered position and be in contact with the base when the workpiece is no longer positioned between the underside of the guard and the base so that the blade is substantially enclosed by the combination of the guard and the slot in the base and;
wherein an opening is provided in the slot in the base, wherein the opening extends completely through the base, wherein the opening is larger than said rotatable blade such that said rotatable blade can pass completely through the opening and wherein the opening is aligned relative to said locking assembly such that said rotatable blade is aligned with the opening when the cutting unit is fixed in the position used in the second mode thereby permitting the blade to be removed and replaced when the cutting unit is fixed in the position used in the second mode;
wherein said bearing assembly is attached to both of said at least two parallel slide members in order to limit non-rotational movement of said rotatable blade to a linear direction along and within the length of the slot only, in parallel with the said slide members and said slot, in order to move said blade along said slot and to retain the axis of rotation of the blade at a fixed height with respect to the base as the workpiece is cut; and
wherein said guard pivot axis is positioned to the rear of the said axis of rotation of the blade with respect to the direction of movement of the cutting unit when in the first cutting mode and with respect to the direction of movement of the workpiece past the cutting unit when the cutting unit is in the second fixed cutting mode.

* * * * *

UNITED STATES PATENT AND TRADEMARK OFFICE
CERTIFICATE OF CORRECTION

PATENT NO. : 10,144,144 B2
APPLICATION NO. : 15/152929
DATED : December 4, 2018
INVENTOR(S) : Robert Firth

Page 1 of 1

It is certified that error appears in the above-identified patent and that said Letters Patent is hereby corrected as shown below:

In the Claims

In Column 14, Claim 14, Line 37, please delete the word "and" before the ";".

Signed and Sealed this
Nineteenth Day of February, 2019

Andrei Iancu
*Director of the United States Patent and Trademark Office*